United States Patent [19]

Engel

[11] Patent Number: 5,033,020

[45] Date of Patent: Jul. 16, 1991

[54] OPTICALLY CONTROLLED INFORMATION PROCESSING SYSTEM

[75] Inventor: Stephen J. Engel, East Northport, N.Y.

[73] Assignee: Grumman Aerospace Corporation, Bethpage, N.Y.

[21] Appl. No.: 308,140

[22] Filed: Feb. 8, 1989

[51] Int. Cl.$^5$ .................. G09C 15/00; G06G 7/00
[52] U.S. Cl. .................... 364/807; 364/513; 307/201
[58] Field of Search ............... 364/602, 513, 807, 713, 364/715.01, 200 MS File, 900 MS File, 837, 822, 575, 517, 820, 862; 365/234, 215, 49, 64; 307/201; 350/380, 342; 250/201; 357/24

[56] References Cited

U.S. PATENT DOCUMENTS

| | | |
|---|---|---|
| 3,950,733 | 4/1976 | Cooper et al. |
| 4,044,243 | 8/1977 | Cooper et al. |
| 4,254,474 | 3/1981 | Cooper et al. |
| 4,326,259 | 4/1982 | Cooper et al. |
| 4,747,069 | 5/1988 | Grinberg et al. ................... 364/807 |
| 4,767,192 | 8/1988 | Chang et al. ...................... 350/342 |
| 4,809,193 | 2/1989 | Jourjine ............................. 364/900 |
| 4,813,772 | 3/1989 | Kowel et al. ...................... 365/64 |
| 4,837,843 | 6/1989 | Owechko ........................... 365/125 |
| 4,843,587 | 6/1989 | Schlunt et al. .................... 364/822 |
| 4,849,619 | 7/1989 | Miida et al. ....................... 250/201 |
| 4,864,522 | 9/1989 | Heimgartner et al. ............ 364/575 |
| 4,914,604 | 4/1990 | Castelaz ............................ 364/517 |
| 4,926,367 | 5/1990 | Arrathoon ......................... 364/713 |
| 4,930,099 | 5/1990 | Castelaz ............................ 364/820 |
| 4,943,556 | 7/1990 | Szu .................................... 364/807 |

*Primary Examiner*—Jerry Smith
*Assistant Examiner*—Jim Trammell
*Attorney, Agent, or Firm*—Scully, Scott, Murphy & Presser

[57] ABSTRACT

An information processing system comprising a plurality of input terminals adapted to receive a plurality of input signals, a plurality of output terminals adapted to present a plurality of output responses, and a plurality of data transfer members. Each data transfer member coupled one of the input terminals with one of the output terminals and provides a transfer of data from that one input terminal to that one output terminal in dependence upon a variable data transfer function. The system further comprises an optical control connected to the data transfer members to control the data transfer functions thereof.

4 Claims, 3 Drawing Sheets

OPTICALLY CONTROLLED INFORMATION PROCESSING SYSTEM

BACKGROUND OF THE INVENTION

This invention generally relates to information processing systems, and more specifically, to a neural network type of information processing system that couples a set of input signals into one or more output signals according to a particular algorithm.

Neural networks are designed to simulate, in a very simplified way, the operation of the human brain; and in a neural network, a multitude of input terminals are coupled to a multitude of output terminals, referred to as neurons, by a multitude of data transfer members. For instance, a particular input terminal may be coupled to one, several, or all of the neurons of the network by the data transfer members; and, conversely, a particular neuron may be coupled to one, several, or all of the input terminals by the data transfer members. Typically, each output terminal generates an output signal that is some function of the sum of weighted values of the input signals coupled to the output terminal, and the weight that is given to a particular input signal by a given output terminal is determined by the data transfer member coupling that input signal to that output terminal.

In many neural networks, the weights that are given to the input signals may change over time. For example, for various applications, certain input signals should produce known output signals; and when such input signals are applied to a neural network, the actual output of the network can be compared to what it should be. If the actual output differs from what it should be, the weights that are applied to the input signals may be adjusted to bring the actual output of the network closer to, or equal to, what it should be.

As a general rule, when the number of neurons in a neural network is increased, the network can handle more complex tasks and can better simulate human thinking. Thus, considerable attention has been given to designing neural networks having a large number of neurons; and for example, neural networks have been designed with several thousand neurons. As will be appreciated, for reasons of economy and reliability, it is highly desirable to manufacture neural networks as integrated circuits.

Various practical factors, such as the large number of physical connections between the parts of a neural network, have heretofore limited the number of neurons that can be located in a neural network of a given size. To elaborate, commonly, each input signal of a neural network may be coupled to most or even all of the output terminals of the network by a respective one data transfer member. Thus, for example, a network having 200 input signals and 200 output terminals might have as many as 40,000 data transfer members, with each data transfer member being physically connected to one input terminal and one output terminal.

Moreover, in neural networks in which adjustable weights can be applied to the input signals, usually each, or most, of the data transfer members is physically connected to a respective control means that controls the weight the data transfer member applies to the input signal conducted to it. Each of these control means includes a multitude of components, such as a variable signal generator that applies a variable control signal to the associated data transfer member, and means to determine the magnitude of this control signal that is applied to the data transfer member. The elements of these control means are also physically connected together.

Each of these connections requires a significant amount of space. Consequently, as the number of neurons in a network increases, the area of an integrated circuit required simply to physically connect together all the parts of the network increases rapidly and this severely restricts the density of the neurons themselves in the circuit.

SUMMARY OF THE INVENTION

An object of the present invention is to improve neural network implementations.

Another object of this invention is to reduce the number of physical connections required to control a neural network of the type in which the variable weights are applied to the input signals, and to thereby allow the density of the neurons in the network to be increased.

A further object of the present invention is to optically control the weights that are applied to the input signals of a neural network.

These and other objects are attained with an information processing system, comprising a plurality of input terminals adapted to receive a plurality of input signals, a plurality of output terminals adapted to present a plurality of output responses, and a plurality of data transfer members. Each data transfer member couples one of the input terminals with one of the output terminals and provides a transfer of data from that one input terminal to that one output terminal in dependence upon a variable data transfer function. The information processing system further comprises optical control means connected to the data transfer members to control the data transfer functions thereof.

Because the data transfer functions of the data transfer members are optically controlled, the number of physical connections required to operate the information processing system is reduced. As a result, a larger number of input terminals, output terminals and data transfer members can be arranged in a given area.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
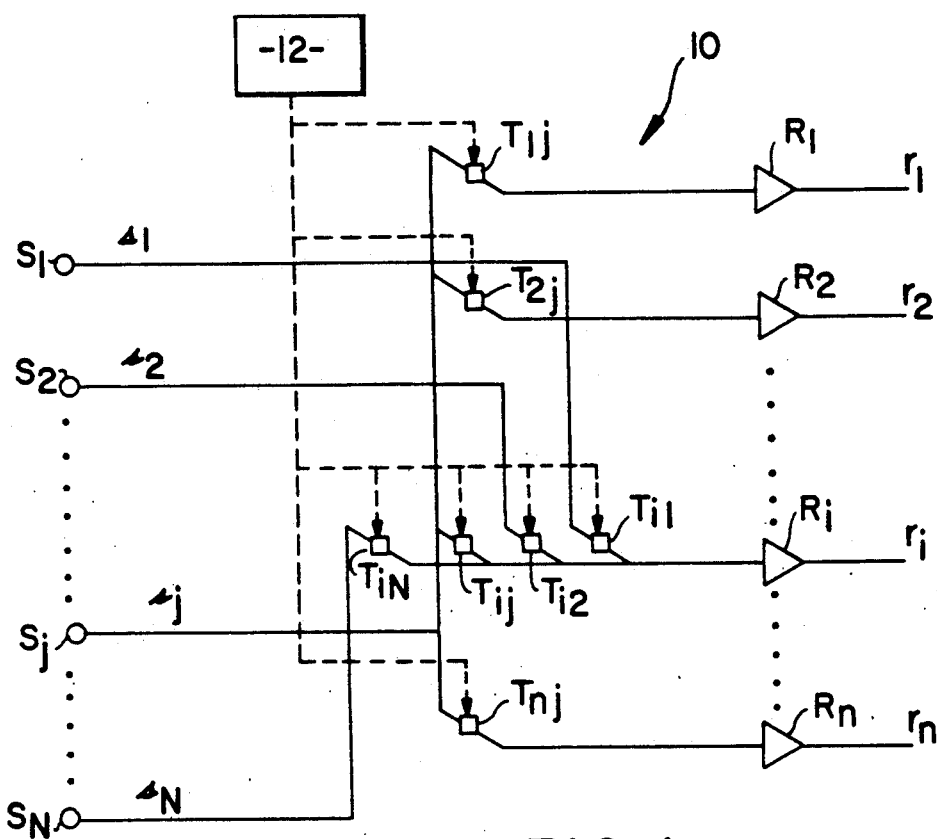
FIG. 1 is a simplified schematic drawing of a portion of an information processing system embodying the present invention.

FIG. 1 generally illustrates information processing system 10 comprising a plurality of input terminals $S_1$, $S_2$..., $S_j$..., $S_N$, adapted to receive N input signals $s_1$, $s_2$..., $s_j$..., $s_N$ respectively; a plurality of output terminals $R_1$, $R_2$..., $R_i$..., $R_n$, adapted to present n output responses $r_1$, $r_2$..., $r_i$..., $r_n$ respectively; and a plurality of data transfer members $T_{1j}$, $T_{2j}$, $T_{il}$, $T_{i2}$, $T_{ij}$, $T_{iN}$, and $T_{nj}$ coupling various ones (or a multiplicity) of the input terminals with various ones (or a multiplicity) of the output terminals. Each data transfer member effects a transfer of information from one of the input terminals to one of the output terminals in dependence upon the signal appearing at that one input terminal and upon a variable transfer function $A_{ij}$ of the data transfer member. System 10 further includes optical control means, generally referenced at 12 in the drawings, and connected to the data transfer members to control the data transfer functions thereof.

The term "transfer function" as it appears throughout the specification and claims, is used in its broad sense to define a function which modifies, in some way, the transfer of information from the input to the output of the data transfer member. In a simple case, the transfer function is equivalent to the gain or amplification of an input signal; however, it will be understood that a signal appearing at the input of a data transfer member may be modified in other ways to produce an appropriate output signal. In any case, the transfer member output signal $s_j$ is specified as being the product of its input signal $s_j$ and the transfer function $A_{ij}$ of the transfer member. Thus, $$s_j' = A_{ij} s_j$$

Preferably, system 10 is of the type in which each of the N input terminals is connected to each of the n output terminals by a single data transfer member. For the purpose of clarity, FIG. 1 shows only the data transfer members coupled to the input terminal $S_j$, and the data transfer members coupled to the output terminal $R_i$. It will be understood, however, that an array of N by n data transfer members are actually provided in the system, so that the values of the transfer functions of the system can be arranged as a matrix:

$$\begin{bmatrix} A_{11} & A_{21} & \cdots & A_{N1} \\ A_{12} & A_{22} & \cdots & A_{N2} \\ \cdot & & & \\ \cdot & & & \\ \cdot & & & \\ A_{1N} & A_{2N} & \cdots & A_{nN} \end{bmatrix}$$

A system such as system 10, in which each of the N input terminals is connected to each of the n output terminals by a single data transfer member, exhibits what is referred to as (N, n) connectivity.

As also will be understood by those of ordinary skill in the art, the numbers of input terminals N and output terminals n of system 10 may assume any values. In particular, the number of input terminals may exceed the number of output terminals, or vice versa, or they may be equal. For convenience, N will be considered to be equal to n.

In system 10, the output signal $r_i$ at each output terminal is some function of the inputs applied thereto, so that:

$$r_i = \sum_{j=1}^{N} f(A_{ij} s_j)$$

For example, the output signal $r_i$ at each output terminal may be a relatively simple, linear function of the inputs applied to the terminal, so that:

$$r_i = \sum_{j=1}^{N} A_{ij} s_j$$

It will be understood, though, that system 10 is not restricted to this linear relationship and that other results may be obtained. For instance, an output response $r_i$ may be made proportional to the product of the inputs $A_{ij} s_j$ over all $j$.

Figure 2:
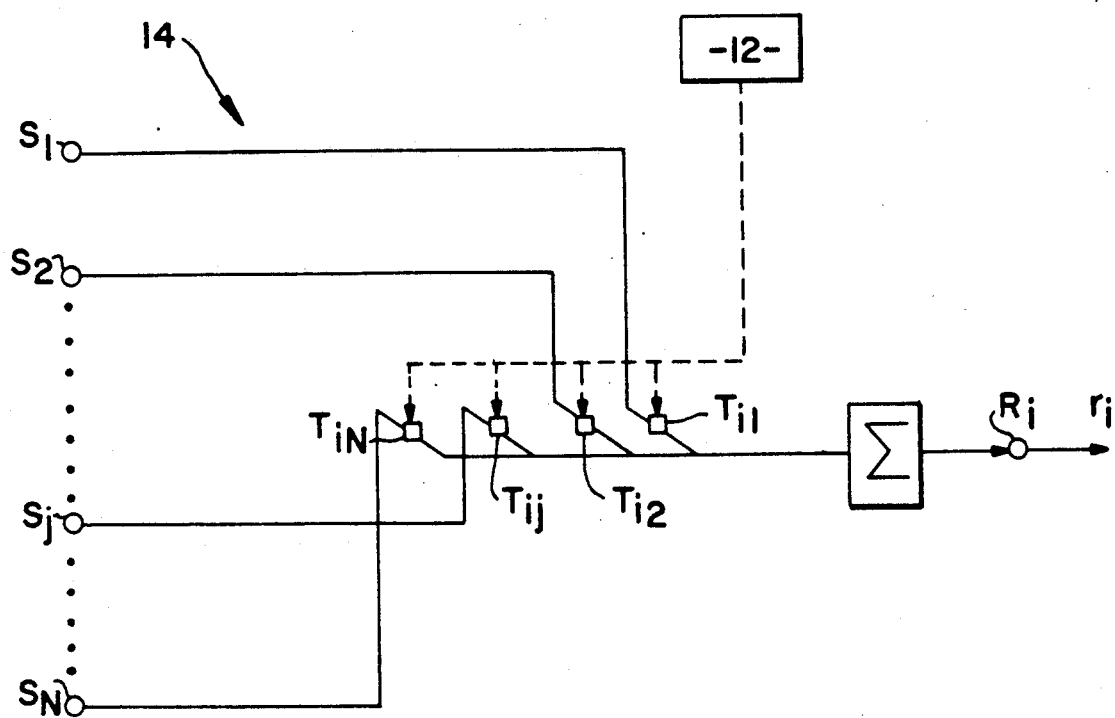
FIG. 2 is a simplified schematic drawing of one module of the information processing system.

System 10 may be considered as being comprised of a plurality of modules, one of which is shown in FIG. 2 and referenced therein at 14. Each module 14 has one summer, $\Sigma$, and, associated therewith, a plurality of input terminals, a plurality of data transfer members, and a single output terminal, and each module 14 produces a single output response $r_i$ at that output terminal. This output response is generated by the module summer in dependence upon the outputs $s_1'$, $s_2'$... $s_j'$... $s_N'$ of N data transfer members $T_{il}$, $T_{i2}$, ..., $T_{ij}$..., $T_{iN}$, respectively. With module 14 illustrated in FIG. 2, each input terminal of the module coupled to the output terminal. This is not necessary, and module 14 may comprise fewer than N data transfer members so that not everyone of the input terminals will be coupled to the summer.

Figure 3:
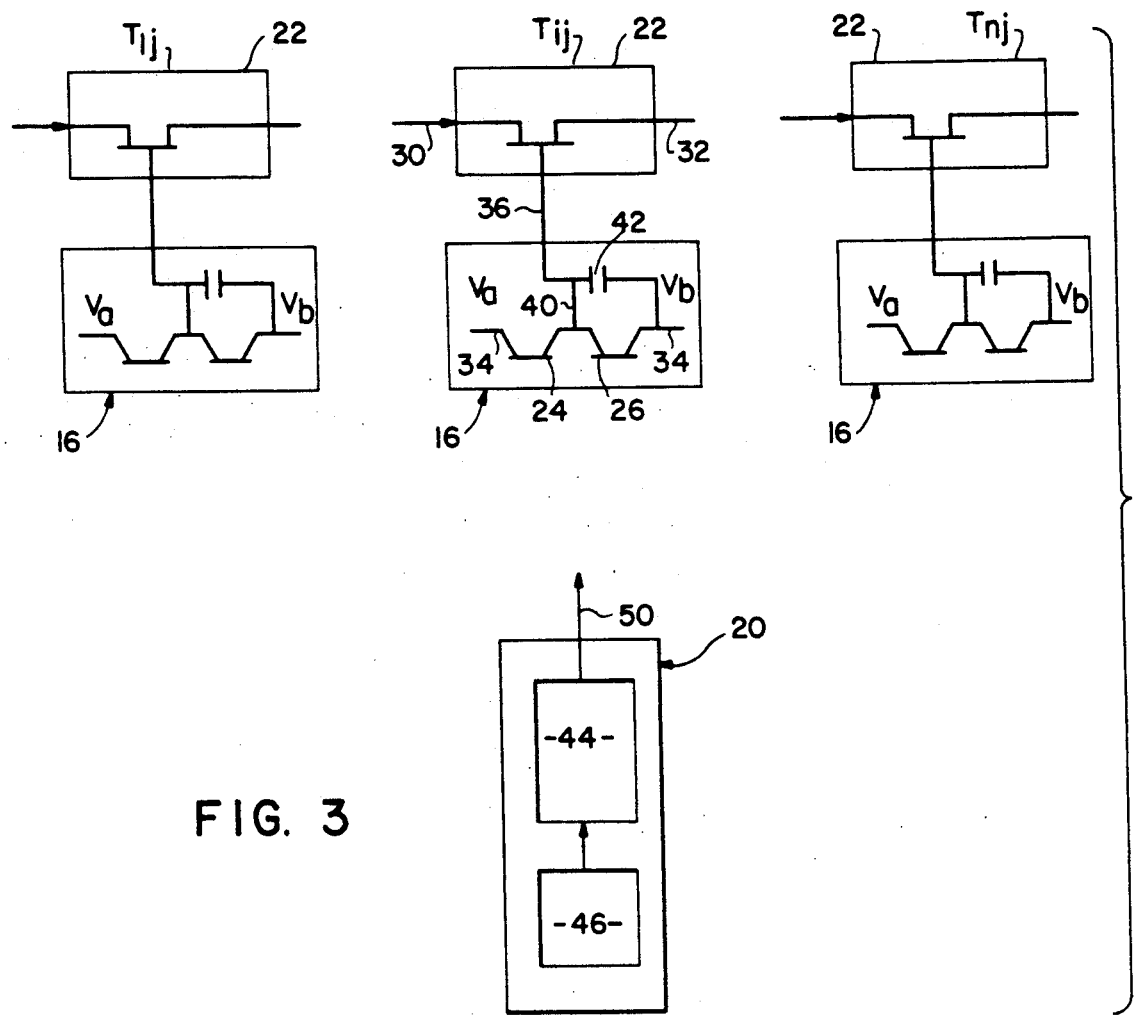
FIG. 3 illustrates an optical control circuit for one of the data transfer members of the information processing system.

Optical control means 12 is connected to the data transfer members to control the data transfer functions thereof. With reference to FIG. 3, preferably optical control means 12 includes a plurality of photosensitive control means 16 and optical addressing means 20. Each of the photosensitive control means is connected to one of the data transfer members of system 10; and, in use, the photosensitive control means generates a control signal that is conducted to that one data transfer member to control the data transfer function thereof in response to optical signals applied to the photosensitive control means.

As will be appreciated by those of ordinary skill in the art, numerous specific devices may be employed as the data transfer members and the photosensitive control means of system 10. For example, with reference to FIG. 3, each data transfer member may comprise a variable resistance device, such as a field effect transistor, and in particular a floating field effect transistor 22; and each photosensitive control means 16 may comprise a pair of light sensitive transistors 24 and 26. In operation, the input signals applied to the input terminals of system 10 may be electric currents and each variable resistance device 22 changes the magnitude of the current $s_j$ appearing on its input line 30, and produces an output current $s_j' = A_{ij} s_j$ on its output line 32.

Photosensitive transistors 24 and 26 are provided to control or adjust $A_{ij}$ over time. Any suitable phototransistors may be used in control means 16, and for example, transistors 24 and 26 may be bipolar or MOS transistors. As illustrated in FIG. 3, transistors 24 and 26 are located in series in line 34, between first and second voltage sources $V_a$ and $V_b$, and the transistor pair are connected to the gain control input of field effect transistor 22 by lines 36 a d 40 and capacito specifically, capacitor 42 is located in line 36, a first end of this line is connected to line 34, between voltage source $V_b$ and transistor 26, and a second end of line 36 is connected to the control input of field effect transistor 22. A first end of line 40 is connected to line 34, between transistors 24 and 26, and a second end of line 40 is connected to line 36, between field effect transistor 22 and capacitor 42.

In the absence of the appropriate radiation, transistors 24 and 26 are non-conductive, in effect acting as open switches in line 34. However, when radiation having an intensity above a threshold level in a predetermined wavelength range strikes the bases of either transistors 24 or 26, the transistor is rendered conductive. When transistor 24 is rendered conductive, current is conducted from voltage source $V_a$ to capacitor 42, increasing the charge thereof. In contrast, when transistor 26 is rendered conductive, current is discharged from the capacitor to voltage source $V_b$, decreasing the charge of capacitor 42.

Preferably, radiation pulses are applied to the bases of transistors 24 and 26 to selectively render these transistors conductive for brief periods of time. The amount of charge added to or removed from capacitor 42 when transistor 24 or 26 is actuated, respectively, is proportional to the product of the amplitude of the radiation pulse applied to the actuated transistor, which determines the effective conductance of the transistor, and the pulse length, which determines the duration of the charging or discharging operation.

With the arrangement illustrated in FIG. 3, when both transistors 24 and 26 are not conductive, the voltage of capacitor 42 decreases over time. This is useful in that it causes the transfer function of transistor 22 to return over time to a constant value, so that, in effect, the data transfer member "forgets" changes from that constant value.

As a result of the operation described above, the charge across the capacitor 42 and, in turn, the voltage applied to gain control input of transistor 22 is the result of an initial charge of capacitor 42, which may be applied via an input terminal before the data transfer member is placed into operation, and the sum total of the charge increments and decrements applied to the capacitor as the result of the repeated applications of radiations pulses to transistors 24 and 26 and the natural exponential decay of the charge on the capacitor.

Figure 4:
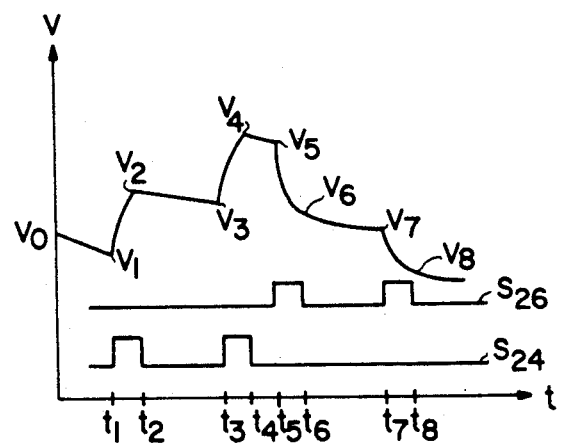
FIG. 4 is a graph showing how a control voltage applied to the data transfer member may vary with changes in the optical signals applied to the phototransistors of the control circuit of FIG. 3.

The manner in which the charge of capacitor 42 may vary over time is illustrated in FIG. 4, which is a graph wherein time is represented by the horizontal axis t, and the charge on the capacitor is represented by the vertical axis V. FIG. 4 also indicates the states of transistors 24 and 26 over time, referenced in FIG. 4 as $S_{24}$ and $S_{26}$ respectively. Both transistors are normally non-conductive; however, transistor 24 is conductive in the period between time $t_1$ and $t_2$ and in the period between time $T_3$ and $t_4$, and transistor 26 is conductive in the period between time $t_5$ and $t_6$ and in the period between time $t_7$ and $t_8$.

At time $t_0$, the initial charge on the capacitor is $V_0$, and this charge gradually decreases to level $V_1$ at time $t_1$ as a result of both transistors 24 and 26 being non-conductive. Once transistor 24 becomes conductive at time $t_1$, the charge of the capacitor rises to level $V_2$ at time $t_2$.

From time $t_2$ to time $t_3$, since both transistors 24 and 26 are non-conductive, the charge on the capacitor gradually decreases to level $V_3$. When transistor 24 again becomes conductive at time $t_3$, the charge on the capacitor increases to level $V_4$ at time $t_4$; and from time $t_4$ to time $t_5$, the charge on the capacitor decreases to level $V_5$ because both transistors 24 and 26 are non-conductive. From time $t_5$ to time $t_6$, the charge of the capacitor more quickly decreases to level $V_6$ as a consequence of transistor 24 being conductive. From time $t_6$ to time $t_7$, the charge of the capacitor again gradually decreases to level $V_7$; while from time $t_7$ to time $t_8$, the capacitor charge decreases to level $V_8$ because transistor 26 is again conductive.

As will be understood by those skilled in the art, capacitor 42 can be charged with either polarity, as well as change polarity, within the limits of $V_a$ and $V_b$. Also, an amplifier may be located in line 36, between capacitor 42 and transistor 22, to amplify the output signal of the capacitor to appropriate levels; and one or more resistors may be located in one or more of lines 34, 36 and 40, either to limit the currents conducted through those lines, or to select the decay constant of capacitor 42.

Optical addressing means 20 is provided to apply the above-mentioned optical signals to photosensitive means 16, specifically the optical transistors of system 10, and any suitable optical addressing means may be employed in the practice of the present invention. With reference to FIG. 3, the optical addressing means may comprise radiation beam generator 44 and controller 46. Beam generator 44, which may for example be a laser, a raster scan or a spatial light modulator, is provided to generate a radiation beam 50 and to scan that beam across the photosensitive control means 16 of system 10; and controller 46 is connected to beam generator 44 to control that generator to actuate radiation beam 50 at selected times for selected periods as the radiation beam is scanned across the photosensitive control means of system 10.

Figure 5:
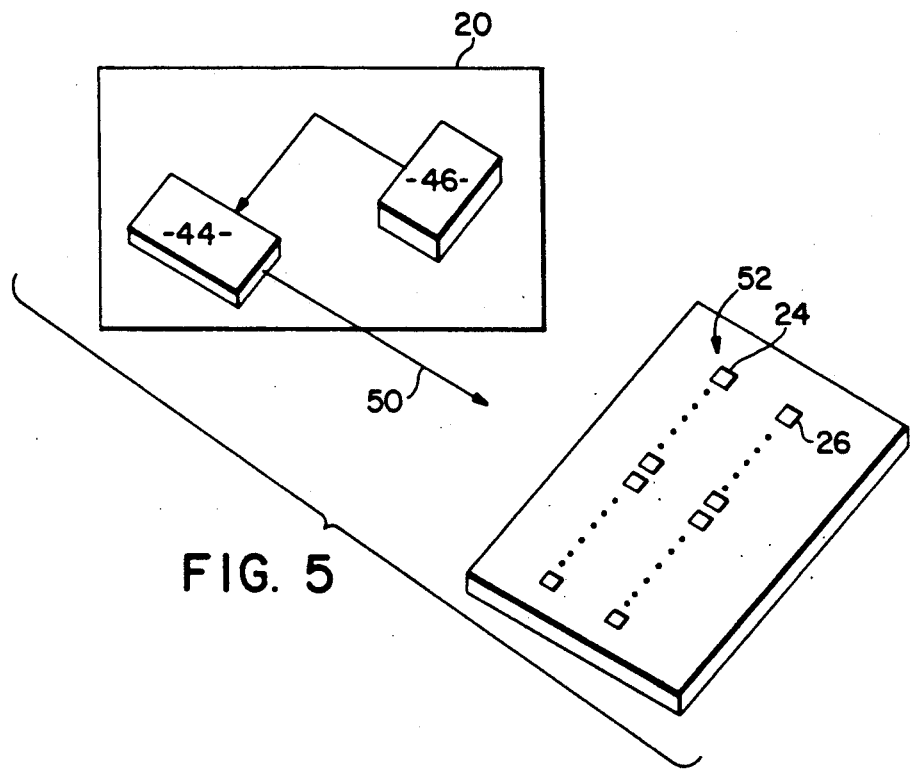
FIG. 5 is a pictorial representation of the information processing system.

FIG. 5 pictorially shows beam generator 44 and controller 46; and as represented in FIG. 5, photosensitive transistors 24 and 26 of system 10 may be arranged in a two dimensional array 52, and beam 50 may be repeatedly scanned across this array in two orthogonal directions at a uniform rate. As beam 50 passes over a particular photosensitive transistor, the beam may be actuated to increase or decrease the data transfer function of the data transfer member associated with that particular transistor, or the beam may be deactuated to allow the weighting factor of the associated data transfer member to decrease as the charge of the associated capacitor naturally decreases. Beam 50 may be actuated and deactuated according to any suitable program to adjust or vary the weights applied by the data transfer members of system 10 to their respective input signals. For example, a control program may be employed that depends on feedback from the output signals of system 10, or a control program may be used that does not depend on such feedback.

Figure 6:
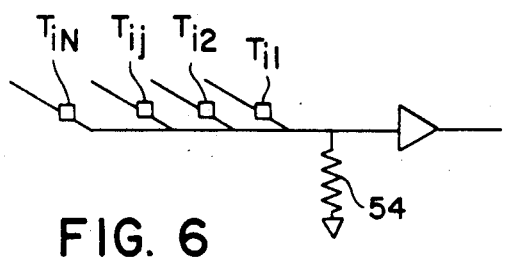
FIGS. 6 and 7 illustrate modifications that may be made to a section of the basic module design of FIG. 2.
Figure 7:
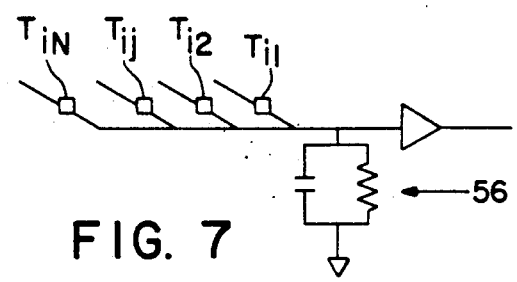

It should be noted that FIGS. 1 through 3 are very simplified schematic drawings and that neural networks are usually much more complex than as shown in these FIGURES. For instance, neurons may be arranged in series in a neural network, with the output of one neuron comprising one of the inputs of a second neuron. Also, a neuron is often provided with two outputs, one of which is used to conduct positive output signals, and the other of which is used to conduct negative output signals. In addition, neural networks often involve feedback signals; and, for example, the weight that a neuron applies to a given input signal may be adjusted depending on the output of that neuron. Further, two neurons may be arranged in series with the output of the first neuron being used as one of the input signals of the second neuron and with the output of the second neuron being fed back to the first neuron and used as one of the input signals thereof. Also, in practice, the summer of each module of the neural network may be, for example, a current amplifier or a voltage amplifier. With reference to FIGS. 6 and 7, if the summer is a voltage amplifier, the input line to the summer may be connected to a ground, or zero voltage level, via a resistor 54, or a resistor-capacitor network 56 to develop a voltage level at the amplifier input.

Figure 8:
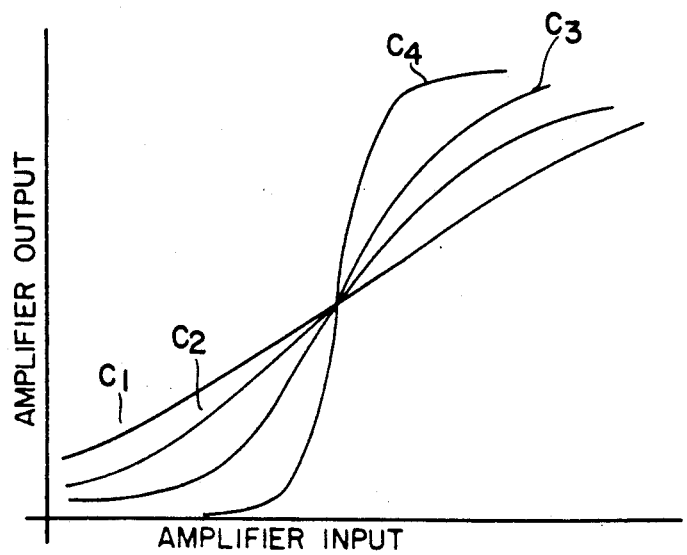
FIG. 8 shows a family of transfer curves that may be applied to a signal by a neuron, or to the output signal of a neuron, of the information processing system.

It is contemplated that photosensitive means 16 may be used to control other elements of a neural network. For example, the output signal of a summer of a neuron may be applied to an amplifier, with the output of that amplifier forming the output of the neuron. This amplifier may be constructed to apply to its input signal any one of a family of transfer curves, such as those shown at $C_1$-$C_4$ in FIG. 8, and the amplifier may be controlled by photosensitive means similar or identical to photosensitive means 16 to select the specific transfer characteristics applied to the signal conducted to the amplifier.

Also, it is contemplated that devices other than field effect transistors may be used as the data transfer members of system 10, and that photosensitive means 16 may be employed to control these other devices. For instance, with modifications to system 10 that are well within the ability of those of ordinary skill in the art, a variable gain operational amplifier may be used as a data transfer member, with the gain of this amplifier being controlled by photosensitive means 16.

In the preferred embodiment of the present invention disclosed herein, the information signals are represented by voltage or current levels. It will be understood that these signals may also be represented by variations in some other aspect of real world electrical signals. For example, the information signals may be represented by frequencies such as pulse repetition frequencies or sinusoidal frequencies, by pulse widths, by currents, by magnetic fields, by magnetizations or even a combination of these Moreover, although the disclosed embodiment is described with reference to electrical signals and charges bearing the information content of an information processing system, numerous other techniques for representing data and for storing information will occur to those skilled in the art and may be employed in the practice of the present invention.

The input signals $s_1, s_2 \ldots, s_j, \ldots, s_N$ to system 10 characterize an "event," which may be an optical event such as the sight of a pattern, or an auditory event such as the hearing of a tone, or any other event. The only requirement for the event is that it be translatable in some way into a plurality of input signals $s_1, s_2, \ldots, s_j, \ldots, s_N$, which retain sufficient detail about the event to be of interest.

The output terminals of system 10 may be connected to any type of output device or processor, or to other data transfer members, depending upon the action to be taken in dependence upon the output responses of the system. If system 10 is utilized to identify visual patterns, for example, the system outputs may be coupled to an alarm device which advises a human operator when a particular pattern has, or has not, been detected. If system 10 is utilized as a pure distributed memory, for example, it may be coupled to a conventional digital computer.

An advantage of the preferred embodiment of system 10 is that control means 12 may be separated from, or external to, the rest of the system 10. Thus, the space needs for beam generator 44 and controller 46 do not affect the density with which the other elements of system 10, such as the input terminals, the data transfer members and the output terminals of the system, may be packed together on, for example, an integrated circuit. In particular, control means 12 may be designed to apply a wide range of paradigms to control the data transfer functions of the data transfer members without affecting the density with which the input terminals, the data transfer members and the output terminals of system 10 may be packed together.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An information processing system, comprising:
   a plurality of input terminals adapted to receive a plurality of input signals;
   a plurality of output terminals adapted to receive a plurality of output responses;
   a plurality of data transfer members, each data transfer member coupling one of said input terminals with one of said output terminals to transfer data from said one input terminal to said one output terminal according to a variable data transfer function; and
   optical control means connected to the data transfer members to control the data transfer functions thereof and to vary the data transfer functions of the data transfer members continuously over a given range,
   the optical control means including
   i) a plurality of photosensitive control means, each of the photosensitive means being connected to one of the data transfer members to generate a control signal and to conduct the control signal to said one data transfer member to control the data transfer function thereof in response to optical signals applied to the photosensitive means, and
   ii) optical addressing means to apply said optical signals to the photosensitive means.

2. An information processing system according to claim 1, wherein:
   the photosensitive control means are arranged in an array; and
   the optical addressing means includes
   i) a radiation beam generator to generate a radiation beam and to scan said beam across said array, and
   ii) a beam controller to actuate deactuate the radiation beam as said radiation beam is scanned across said array to selectively actuate the photosensitive control means.

3. An information processing system, comprising:
   a plurality of input terminals adapted to receive a plurality of electric current input signals;
   a plurality of output terminals adapted to present a plurality of output responses;

a plurality of data transfer members, each data transfer member coupling one of said input terminals with one of said output terminals to transfer data from said one input terminal to said one output terminal according to a variable data transfer function, and including a variable resistance means to vary the magnitude of the input signal received by the one input terminal coupled to the data transfer member; and optical control means connected to the data transfer members to control the data transfer functions thereof and including i) a plurality of photosensitive control means, each of the photosensitive means being connected to one of the data transfer members to generate a control signal and to conduct the control signal to said one data transfer member to control the data transfer function thereof in response to optical signals applied to photosensitive means, and ii) optical addressing means to apply said optical signals to the photosensitive means;

each photosensitive control means including i) a capacitor connected to one of the variable resistance means to apply a variable voltage potential to said one resistance means to control the resistance thereof, ii) a first photosensitive transistor having a non-conductive state and a conductive state to connect the capacitor to a first voltage level to increase said variable voltage potential, and iii) a second photosensitive transistor having a non-conductive state and a conductive state to connect the capacitor to a second voltage level to decrease said variable voltage potential, said first and second photosensitive transistors normally being non-conductive; and the optical addressing means applying said optical signals to the first and second photosensitive transistors of the photosensitive control means to render said transistors conductive.

4. An information processing system according to claim 3, wherein the variable means is a field effect transistor.

* * * * *

UNITED STATES PATENT AND TRADEMARK OFFICE
CERTIFICATE OF CORRECTION

PATENT NO. : 5,033,020

DATED : July 16, 1991

INVENTOR(S) : Stephen J. Engel

It is certified that error appears in the above-identified patent and that said Letters Patent is hereby corrected as shown below:

In the Abstract, lines 5-6: "coupled" should read as --couples--

Column 3, line 36: "$s_j = A_{ij} s_j$" should read as --$s_j' = A_{ij} s_j$--

Column 4, line 29: "terminal" should read as --terminal.--

Column 4, line 34: "module coupled" should read as --module is coupled--

Column 4, line 64: "$A_{ij}sj$" should read as --$A_{ij}s_j$--

Column 5, line 5: "a d" should read as --and--

Column 5, line 5: "capacito specifically" should read as --capacitor 42. More specifically--

Column 5, line 61: "$T_3$" should read as --$t_3$--

Column 7, line 47: "these" should read as --these.--

Column 10, line 20: "variable means" should read as --variable resistance means--

Signed and Sealed this

Second Day of February, 1993

*Attest:*

STEPHEN G. KUNIN

*Attesting Officer*      *Acting Commissioner of Patents and Trademarks*